No. 800,113. PATENTED SEPT. 19, 1905.
F. KASSIAN.
APPARATUS FOR SEPARATING SOLID SUBSTANCES FROM LIQUIDS.
APPLICATION FILED OCT. 10, 1904.
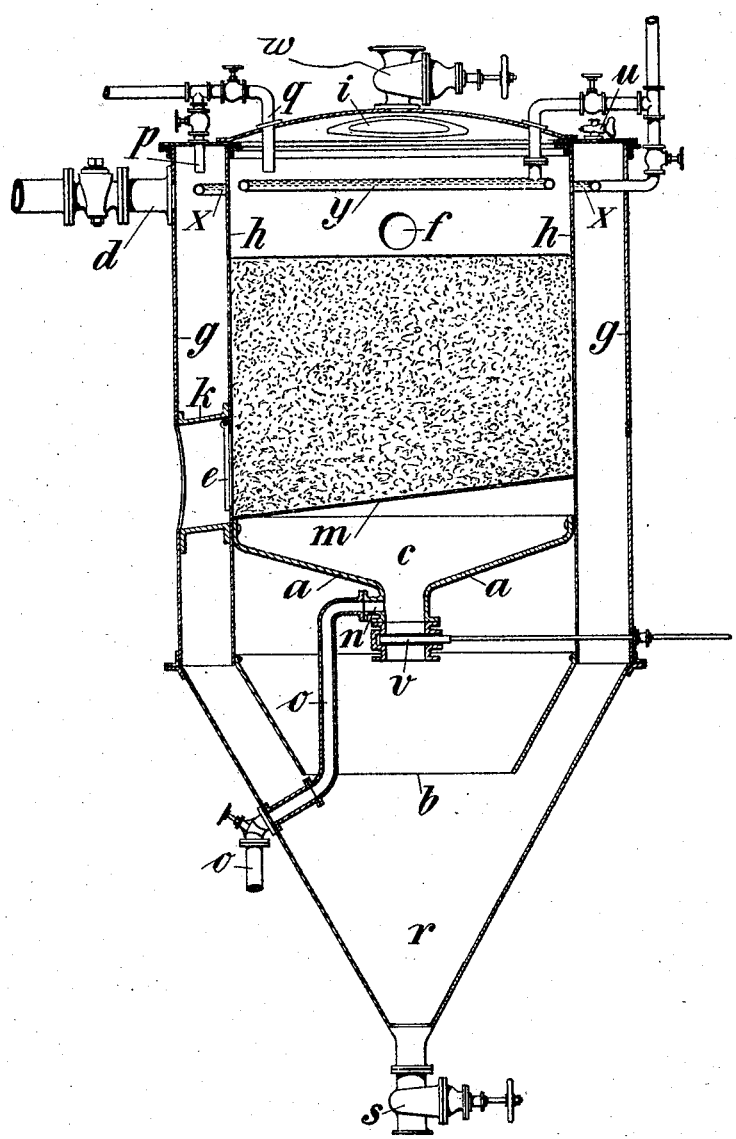
Witnesses
Inventor
Francisco Kassian
By James L. Norris
Atty

UNITED STATES PATENT OFFICE.

FRANCISCO KASSIAN, OF MEXICO CITY, MEXICO.

APPARATUS FOR SEPARATING SOLID SUBSTANCES FROM LIQUIDS.

No. 800,113.	Specification of Letters Patent.	Patented Sept. 19, 1905.

Application filed October 10, 1904. Serial No. 227,933.

*To all whom it may concern:*

Be it known that I, FRANCISCO KASSIAN, engineer, a subject of the Emperor of Austria-Hungary, residing at Mexico City, Republic of Mexico, have invented certain new and useful Improvements in Apparatus for Separating Solid Substances from Liquids, of which the following is a specification.

In the technical arts it is frequently necessary for the purpose of separating solid constituents to induce fluids to deposit a portion of the solid substances first by allowing them to stand, by suddenly checking the speed of flow, or by altering the direction of the movement, and afterward to fully purify them by filtration. This is the case, for instance, in sugar-juice coming from the separation-pan.

This invention provides an apparatus for this object which produces both kinds of separation, and thus allows an uninterrupted working, enabling the filter to be cleaned without substantial interruption of the working and rendering it unnecessary to change the filtering media.

As shown in vertical section in the accompanying drawing, the apparatus consists of a casing in which two or more chambers $g$ $h$ are located, which are preferably arranged, as shown, as cylinders having a uniform axis. The outer cylinder $g$ has a tapering bottom provided with a valve $s$ for closing it. The vessel $h$, the lower part of which is also tapering, is closed either at its deepest point or, as shown in the drawing, at a point somewhat above this by a bottom plate $a$, provided with a slide $v$ or other suitable means of closing. Over this bottom plate $a$ a second sieve-like one, $m$, is arranged, on which suitable filtering material—such, for instance, as sand, volcanic pumice-stone, or the like—is spread. Both vessels are closed above.

The fluid to be purified or separated passes through a pipe $d$ into the vessel $g$, fills it, and rises through the opened valve $v$ into the vessel $h$, thus passing through the filter. In consequence of the reversal of movement at the lower edge of the vessel $h$ and the enlargement of section there existing the liquid allows the heavier impurities to drop, which are carried off through the valve $s$. The fluid passing into the filter thus only requires to be freed from the finer impurities. The purified juice is discharged through an aperture $f$, preferably placed somewhat lower than the admission $d$.

The cleaning of the filter takes place in the following way: When the admission of fluid at $d$ is interrupted and the sludge deposited discharged through the valve $s$ from the bottom chamber $r$, steam (or another suitable pressure medium) is admitted through a pipe $p$, projecting into the upper part of the vessel $g$, which steam forces the liquid contained in the annular space between the two vessels $g$ and $h$ through the filter. Before the surface of the liquid has reached the lower edge $b$ of the inner vessel, which may be inspected by means of a spy-hole, inflow is stopped. A pressure-pipe $q$, provided in the vessel $h$ and conveying steam or other suitable medium, is then opened, which forces the liquid standing in and on the filter out of the vessel $h$ back again into the vessel $g$. Counter-pressure may be obviated by means of an air-valve $u$ or by water being admitted, by means of a spraying or jet pipe $x$, into the steam-filled chamber of the vessel $g$, which water condenses the steam. In this case the use of the pressure-pipe $q$ may also be entirely dispensed with if atmospheric air be given access to the vessel $h$ by means of a valve $w$. When the vessel $h$ is emptied, the bottom slide $v$ is closed, and water introduced through a jet-pipe $y$ passes through the filtering layer, thereby cleaning it, and, together with the impurities washed out, quits the chamber $c$ by means of a nozzle $n$ and pipe $o$, which have been opened in the meantime. If necessary, this cleaning may be assisted by the introduction of steam, (through the pipe $q$.) When the washing is completed, a supplementary cleaning and drying, by means of steam, may take place by the help of the pipe $q$. The pipe $o$ is then closed, the valve $v$ again opened, and after the pipe $d$ has been opened the separating operation is recommenced.

The filtering substance is introduced through a manhole-like aperture $i$ in the cover of the vessel $h$ and removed through a similar aperture $e$, arranged in the lower part, access to this being obtained through a suitable nozzle $k$.

I declare that what I claim is—

1. An apparatus of the class described involving a vessel separated into two chambers communicating with each other below their upper ends, one chamber being adapted to be downwardly traversed by liquid, a filter in the other chamber through which said liquid is adapted to flow upwardly, a pressure-pipe for conducting a pressure medium into that chamber through which the liquid downwardly passes, said medium serving to force the liquid upwardly through the filter, and a second pressure-pipe for conducting a pressure medium into the filter-chamber for forcing the liquid downwardly through the filter and out the filter-chamber.

2. An apparatus of the class described involving a vessel separated into two chambers communicating with each other below their upper ends, one chamber being adapted to be downwardly traversed by liquid, a filter in the other chamber, through which said liquid is adapted to flow upwardly, a pressure-pipe leading into that chamber through which the liquid downwardly passes and serving to force the liquid upwardly through the filter, and a spraying water-pipe in that chamber which is downwardly traversed by the liquid.

3. An apparatus of the class described involving a vessel divided into two chambers communicating below their upper edges, one chamber being adapted to be downwardly traversed by liquid, a filter in the other chamber, through which the liquid is adapted to pass, a water-pipe in the filter-chamber, above the filter, a valve for closing the filter-chamber below the filter, and a water-pipe connected with the filter-chamber above the valve and leading out of the vessel.

4. An apparatus of the class described involving a vessel provided with two communicating chambers, one constituting a filter-chamber and being provided with a filter, through which liquid is adapted to pass in one direction when flowing from the other chamber in an opposite direction, means for supplying water against the filter in a direction opposite to the flow of the liquid through said filter, a valve for the filter-chamber, arranged at the side of the filter opposite that into which water is supplied to the filter-chamber, and an outlet-pipe connected with the filter-chamber between the valve and the filter and extending outward through the vessel.

In testimony whereof I have hereunto set my hand in presence of the subscribing witnesses.

FRANCISCO KASSIAN.

Witnesses:
A. W. GOBRECHT,
JAMES RUSSELL PARSONS, Jr.,
L. HARTMANN.